US012618437B2

(12) United States Patent
Liu et al.

(10) Patent No.: US 12,618,437 B2
(45) Date of Patent: May 5, 2026

(54) BALL SPLINE DEVICE, AUTOMATED GUIDED VEHICLE AND STEREOSCOPIC WAREHOUSE SYSTEM

(71) Applicant: BEIJING JINGDONG QIANSHI TECHNOLOGY CO., LTD., Beijing (CN)

(72) Inventors: Chen Liu, Beijing (CN); Zongjing Yu, Beijing (CN); Guoku Song, Beijing (CN); Xu Liu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 356 days.

(21) Appl. No.: 18/245,415

(22) PCT Filed: Mar. 11, 2021

(86) PCT No.: PCT/CN2021/080165
§ 371 (c)(1),
(2) Date: Mar. 15, 2023

(87) PCT Pub. No.: WO2022/062325
PCT Pub. Date: Mar. 31, 2022

(65) Prior Publication Data
US 2023/0349420 A1 Nov. 2, 2023

(30) Foreign Application Priority Data
Sep. 22, 2020 (CN) .......................... 202011004699.0

(51) Int. Cl.
*F16C 29/06* (2006.01)
*F16C 31/06* (2006.01)
*F16D 3/06* (2006.01)

(52) U.S. Cl.
CPC .......... *F16C 29/0695* (2013.01); *F16C 31/06* (2013.01); *F16D 3/065* (2013.01); *F16C 2326/01* (2013.01)

(58) Field of Classification Search
CPC .... F16C 3/035; F16C 29/068; F16C 29/0683; F16C 29/0685; F16C 29/0688;
(Continued)

(56) References Cited

U.S. PATENT DOCUMENTS 3,707,884 A 1/1973 Go
8,123,407 B2 * 2/2012 Shirai ..................... F16D 3/065
384/43
(Continued)

FOREIGN PATENT DOCUMENTS

CN 101542147 B 6/2011
CN 203967898 U 11/2014
(Continued)

OTHER PUBLICATIONS

"Third Party Observation", JP Application No. 2023-514093, Apr. 22, 2024, 1 p.
(Continued)

*Primary Examiner* — James Pilkington
(74) *Attorney, Agent, or Firm* — Myers Bigel, P.A.

(57) ABSTRACT

A ball spline device includes a spline shaft, the outer side wall provided with raceway grooves extending in the axial direction, each raceway groove comprising, a first groove section and a second groove section, and the width of the second groove section being greater than that of the first groove section; a spline nut coaxially fitted over the spline shaft; and first rolling bodies. When the spline nut is located at a first position, the first rolling bodies are located in the first groove sections and in constraint fit with the first groove sections; and when the spline nut is located at a second
(Continued)

position, the first rolling bodies are located in the second groove sections, such that the spline nut and the spline shaft have a preset movement amount in the circumferential direction. Further provided are an automated guided vehicle and a stereoscopic warehouse system.

12 Claims, 3 Drawing Sheets

(58) Field of Classification Search
CPC ................ F16C 29/069; F16C 29/0692; F16C 29/0695; F16C 29/0697; F16C 31/06; F16D 3/065
See application file for complete search history.

(56) References Cited

U.S. PATENT DOCUMENTS

| | | | | |
|---|---|---|---|---|
| 9,091,301 | B2 * | 7/2015 | Chang | F16C 29/0695 |
| 12,129,889 | B2 * | 10/2024 | Lee | F16H 25/2214 |
| 12,247,613 | B2 * | 3/2025 | Kwon | F16C 29/0695 |
| 2010/0098358 | A1 | 4/2010 | Shirai | |
| 2014/0150597 | A1 | 6/2014 | Buzzard et al. | |
| 2019/0264745 | A1 | 8/2019 | Hiramatsu et al. | |
| 2020/0087067 | A1 | 3/2020 | Fosnight et al. | |

FOREIGN PATENT DOCUMENTS

| | | | | | |
|---|---|---|---|---|---|
| CN | 106476007 | A | | 3/2017 | |
| CN | 107191481 | A | * | 9/2017 | |
| CN | 207569089 | U | | 7/2018 | |
| CN | 109018548 | A | | 12/2018 | |
| CN | 208897469 | U | | 5/2019 | |
| CN | 111406167 | A | | 7/2020 | |
| CN | 211392788 | U | | 9/2020 | |
| JP | 2014047863 | A | | 3/2014 | |
| JP | 2020045246 | A | | 3/2020 | |
| KR | 20190001282 | U | | 6/2019 | |
| WO | WO-2008065958 | A1 | * | 6/2008 | ............ F16C 29/001 |
| WO | 2018092673 | A1 | | 5/2018 | |
| WO | 2020179265 | A1 | | 9/2020 | |

OTHER PUBLICATIONS

"Communication with Supplementary European Search Report", EP Application No. 21870714.9, Mar. 20, 2024, 7 pp.
"First Office Action and English language translation", CN Application No. 202011004699.0, May 28, 2021, 16 pp.
"International Search Report and Written Opinion of the International Searching Authority with English language translation", International Application No. PCT/CN2021/080165, Apr. 30, 2021, 14 pp.
Notice of Reasons for Refusal and English language translation, JP Application No. 2023-514093, Mar. 11, 2025, 8 pp.

* cited by examiner

BALL SPLINE DEVICE, AUTOMATED GUIDED VEHICLE AND STEREOSCOPIC WAREHOUSE SYSTEM

CROSS-REFERENCE TO RELATED APPLICATIONS

The present application is a U.S. National State Application under 35 U.S.C. § 371 of International Application No. PCT/CN2021/080165, filed Mar. 11, 2021, which itself is based on and claims priority to Chinese Application No. 202011004699.0, filed on Sep. 22, 2020, the disclosure of both of which are hereby incorporated into the present disclosure in their entireties.

TECHNICAL FIELD

The present disclosure relates to the technical field of mechanical transmission, in particular to a ball spline device, an automated guided vehicle and a stereoscopic warehouse system.

BACKGROUND

A ball spline is a component having a raceway groove machined on a spline shaft and a steel ball, on a spline nut, cooperating with the raceway groove on the spline shaft, so that the spline nut can move along the axial direction on the spline shaft and also can transmit torque and force.

The raceway on the spline shaft of the ball spline at present cooperates with the steel ball in a constrained manner in the whole length, so that the spline shaft and the spline nut have a strict transmission ratio, and when the spline shaft is required to rotate by a small angle relative to the spline nut in the application process, it is difficult for the ball spline structure at present to achieve this function.

SUMMARY

According to a first aspect of the present disclosure, a ball spline device is provided, including:
  a spline shaft, the outer side wall of which is provided with a raceway groove extending along the axial direction, the raceway groove includes a first groove section and a second groove section communicated along the axial direction, a width of the second groove section being greater than a width of the first groove section;
  a spline nut, coaxially sleeved outside the spline shaft; and
  a first rolling body, movably disposed in the raceway groove along the axial direction, so as to achieve relative movement of the spline nut and the spline shaft;
  wherein when the spline nut is in a first position, the first rolling body is in the first groove section, and cooperates with the first groove section in a constrained manner, so as to cause synchronous rotation of the spline nut and the spline shaft; and when the spline nut is in a second position, the first rolling body is in the second groove section, so that there is a predetermined gap in a circumferential direction between the spline shaft and the spline shaft.
  In some embodiments, the raceway groove further includes a transition groove section, the transition groove section connected between the first groove section and the second groove section, and configured to guide the first rolling body to switch between the first groove section and the second groove section.

In some embodiments, both side walls of the transition groove section are bevels, and have a distance therebetween gradually increasing from the first groove section to the second groove section.

In some embodiments, the second groove section is located in the middle region of the spline shaft along the axial direction, and both ends of the second groove section are provided with the first groove section.

In some embodiments, a plurality of groups of raceway grooves are disposed along the circumferential direction, each group of the raceway grooves including two spaced raceway grooves, and a circumferential spacing between two adjacent groups of raceway grooves being greater than that between two adjacent raceway grooves in the same group.

In some embodiments, a first end of the spline shaft has a first mounting portion configured to connect to a drive member that provides power to the rotation of the spline shaft; and a second end of the spline shaft has a second mounting portion configured to be connected with an external first transmission member.

In some embodiments, the present disclosure further includes:
  two groups of first seal members, disposed between the spline nut and the spline shaft and located at two ends of the spline nut along the axial direction;
  wherein the first rolling body is located between the two groups of first seal members.
  In some embodiments, the spline nut includes:
  an inner nut, sleeved outside the spline shaft;
  an outer nut, sleeved outside the inner nut; and
  a second rolling body, movably disposed between the inner nut and the outer nut along the circumferential direction, so as to enable relative rotation of the inner nut and the outer nut;
  wherein the first rolling body is disposed between the inner nut and the raceway groove.
  In some embodiments, the present disclosure further includes:
  two groups of second seal members, disposed between the inner nut and the outer nut and located at two ends of the outer nut along the axial direction;
  wherein the second rolling body is located between the two groups of second seal members.
  According to a second aspect of the present disclosure, an automated guided vehicle is provided, including:
  the ball spline device in the above embodiments;
  a wheel, coaxially mounted to the spline nut; and
  a drive member, configured to provide drive power for the rotation of the spline shaft.
  In some embodiments, the spline nut includes:
  an inner nut, sleeved outside the spline shaft and connected with the wheel; and
  an outer nut, sleeved outside the inner nut and rotatably relative to the inner nut, and connected with a support frame disposed on the automated guided vehicle;
  wherein the first rolling body is disposed between the inner nut and the raceway groove.
  In some embodiments, a first end of the spline shaft has a first mounting portion, the drive member is in drive connection with the first mounting portion, and a second end of the spline shaft has a second mounting portion;
  the automated guided vehicle further includes a first transmission member, the first transmission member connected to the second mounting portion and configured to cooperate with an external second transmission member.

In some embodiments, when the spline nut is in the second position, the first transmission member is configured to be adjusted to cooperate with the second transmission member while a position of the wheel remains unchanged.

In some embodiments, the automated guided vehicle has a walking mode and a moving mode when the spline nut is in the first position;

wherein in the walking mode, the automated guided vehicle is configured to drive rotation of the wheel through driving the spline shaft by the drive member to achieve walking; and in the moving mode, the automated guided vehicle is configured to drive rotation of the first transmission member through driving the spline shaft by the drive member, so as to achieve movement through cooperation of the first transmission member and the second transmission member.

According to a third aspect of the present disclosure, a stereoscopic warehouse system is provided, including:

a stereoscopic warehouse, having a plurality of layers of storage positions and provided with a second transmission member which includes a vertical rack; and the automated guided vehicle in the above embodiment, including a first transmission member which includes a gear, a first end of the spline shaft having a first mounting portion, the drive member being in drive connection with the first mounting portion, and a second end of the spline shaft having a second mounting portion connected to the gear;

wherein when the spline nut is in the second position, the gear is configured to be adjusted to cooperate with the second transmission member while a position of the wheel is unchanged.

In some embodiment, the predetermined gap is not smaller than a tooth width of the gear or the rack.

In some embodiments, the automated guided vehicle is configured to have a walking mode and a moving mode when the spline nut is in the first position;

in the walking mode, the automated guided vehicle is configured to drive rotation of the wheel through driving the spline shaft by the drive member to achieve walking; and in the moving mode, the automated guided vehicle is configured to drive motion of the gear along the rack through driving the spline shaft by the drive member to achieve movement in the vertical direction, so as to reach storage positions in different layers.

BRIEF DESCRIPTION OF THE DRAWINGS

Drawings illustrated herein are used for providing further understanding of the present disclosure and form part of the present application, and illustrative embodiments of the present disclosure and description thereof are intended for explaining instead of improperly limiting the present disclosure. In the drawings.

Figure 1:
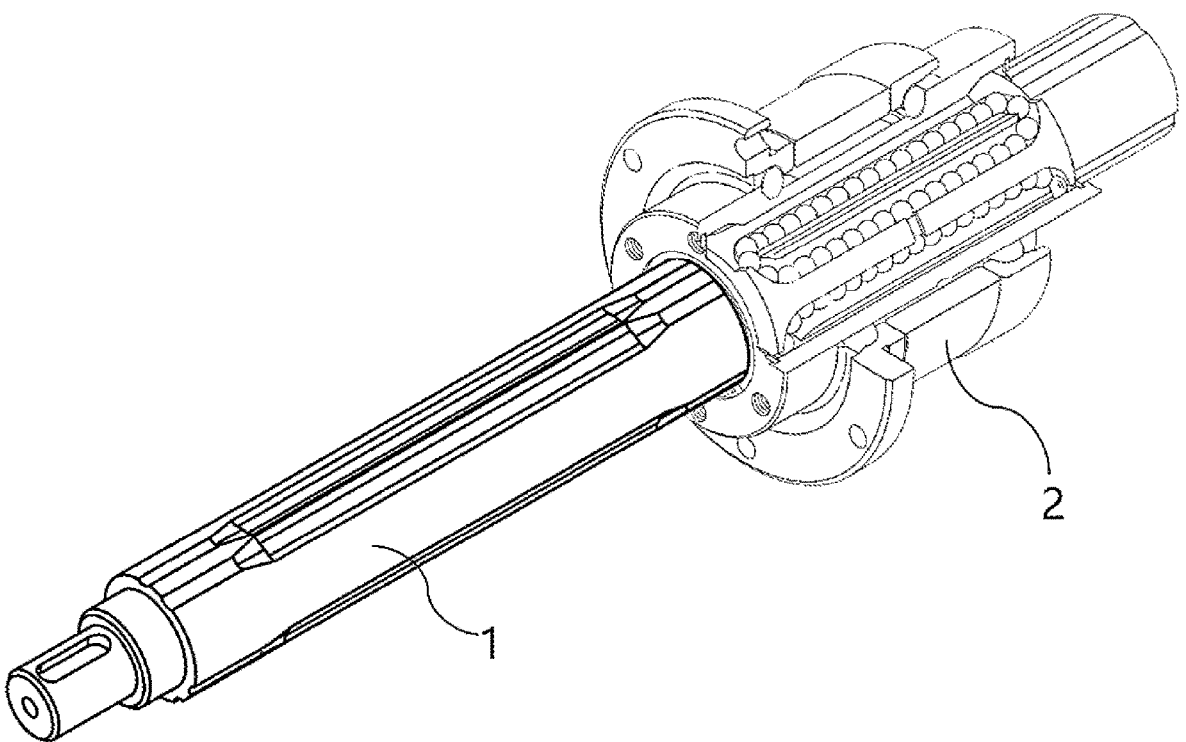
FIG. 1 is a structure diagram of some embodiments of a ball spline device of the present disclosure.

REFERENCE NUMERALS 1, spline shaft; 11, first groove section; 12, second groove section; 13, transition groove section; 131, bevel; 14, main body shaft section; 15, transition shaft section; 16, first mounting portion; 161, keyway; 17, second mounting portion; 2, spline nut; 21, inner nut; 22, outer nut; 221, flange structure; 23, first rolling body; 24, second rolling body; 25, first seal member; 26, second seal member; 27, first holder; 271, guide groove; 3, wheel; 4, drive member; 5, first transmission member; 6, stereoscopic warehouse; 7, second transmission member; 8, support frame.

DETAILED DESCRIPTION

The present disclosure will be illustrated below in detail. In the following paragraphs, different aspects of the embodiments are defined in more detail. Various aspects such defined may be combined with any one or more other aspects, unless otherwise stated expressly. In particular, any feature considered to be preferred or advantageous may be combined with one or more other features considered to be preferred or advantageous.

Terms such as "first" and "second" appearing in the present disclosure are merely for the ease of description to distinguish different constituent components, instead of representing a sequential or primary and secondary relationship.

In the description of the present disclosure, the orientation or position relationships indicated by "upper", "lower", "top", "bottom", "front", "back", "inside", "outside" and the like are orientation or position relationships based on what are shown in the drawings, only for the sake of facilitating describing the present disclosure, instead of indicating or implying that the device referred to must have a specific orientation and be constructed and manipulated in a specific orientation, and therefore they should not be understood as limitations to the protection scope of the present disclosure. Moreover, "axial direction", "circumferential direction" and "radial direction" mentioned in subsequent embodiments are all defined with respect to the ball spline device serving as baseline.

Embodiments of the present disclosure provide a ball spline device, an automated guided vehicle and a stereoscopic warehouse system, which can broaden functions of the ball spline device and better meet use requirements.

The ball spline device in some embodiments of the present disclosure sets the same raceway groove on the spline shaft into two structures with different widths. Therefore, when the spline nut is in a position corresponding to the first groove section, the spline shaft cooperates with the spline nut in a constrained manner to transmit torque and force; and when the spline nut is in a position corresponding to the second groove section, the first rolling body has a larger clearance with the side wall of the second groove section, so that there's a wobble amount between the spline shaft and the spline nut along the circumferential direction, for example, when the spline remains immobile, the spline shaft is allowed to have a small wobble amount, thus it is easy to realize connection or cooperation of the spline shaft with other external components. Such ball spline device can realize more functions, and improve the flexibility of applications.

The present disclosure provides a ball spline device, as shown in FIGS. 1 to 6, including a spline shaft 1, a spline nut 2 and a first rolling body 23.

The outer side wall of the spline shaft 1 is provided with a raceway groove extending along the axial direction, the raceway groove includes a first groove section 11 and a second groove section 12 communicated along the axial direction, the width of the second groove section 12 being greater than the width of the first groove section 11. The spline nut 2 is coaxially sleeved outside the spline shaft 1. The first rolling body 23 is movably disposed in the raceway groove along the axial direction to achieve relative movement of the spline nut 2 and the spline shaft 1 along the axial direction; and the spline nut 2 is configured to restrict the degree of freedom of movement of the first rolling body 23 along the radial direction. A plurality of first rolling bodies 23 can be disposed in the raceway groove along the axial direction to form a column of first rolling bodies 23, which may be, for example, balls, rolling rods, etc.

Figure 4:
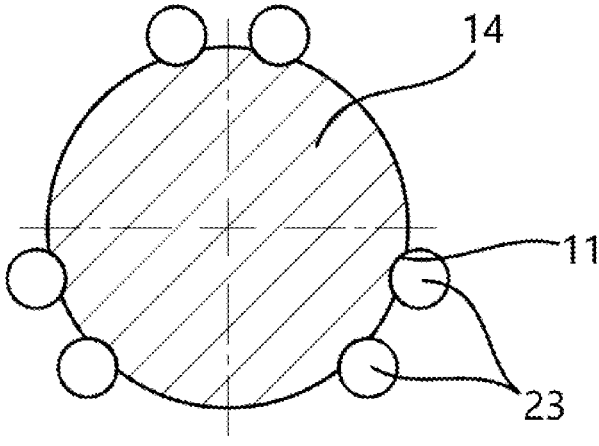
FIG. 4 is a schematic diagram of the state of cooperation of a first rolling body and a first groove section.

Wherein, as shown in FIG. 4, when the spline nut 2 moves along the axial direction to a first position, the first rolling body 23 is in the first groove section 11, and cooperates with the first groove section 11 in a constrained manner to cause synchronous rotation of the spline nut 2 and the spline shaft 1. In order to transmit power, the inner wall of the spline nut 2 is also provided with a raceway groove. Cooperation in a constrained manner refers to that the two side walls of the first groove section 11 are in contact cooperation with the first rolling body 23, and can restrict the degree of freedom of movement of the first rolling body 23 along the circumferential direction. For example, the first groove section 11 has an arc-shaped cross section, and has the same radius of curvature as the first rolling body 23 which is a ball.

Figure 5:
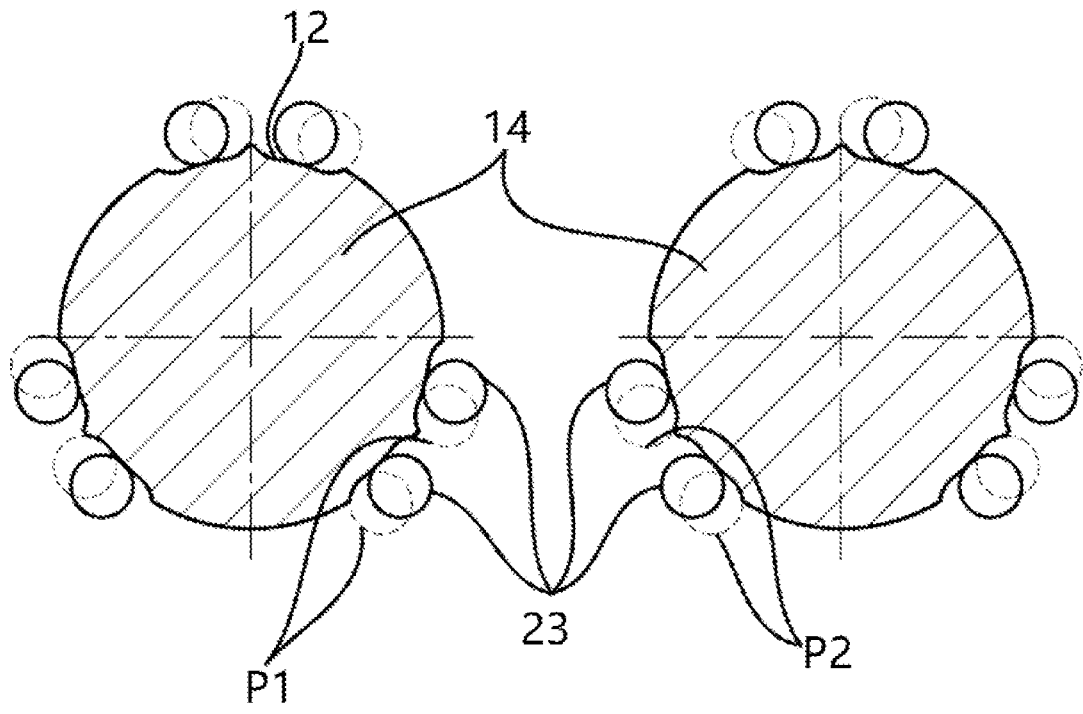
FIG. 5 is a schematic diagram of the state of cooperation of the first rolling body and a second groove section.

As shown in FIG. 5, when the spline nut 2 moves along the axial direction to a second position, the first rolling body 23 is in the second groove section 12, and can move along the circumferential direction in the second groove section 12, so that the spline nut 2 has a predetermined gap with the spline shaft 1 in the circumferential direction. For example, the second groove section 12 is planar at the bottom, and is arc-shaped at both sides. The dashed line on the left of FIG. 5 shows the schematic diagram of the state in which the first rolling body 23 moves clockwise to the right limit position P1 in the second groove section 12, and the dashed line on the right of FIG. 5 shows the schematic diagram of the state in which the first rolling body 23 moves counterclockwise to the left limit position P2 in the second slot section 12. When the clockwise or counterclockwise rotation angle of the spline shaft 1 is smaller than the clearance between the first rolling body 23 and the side wall of the second groove section 12, the spline shaft 1 cannot drive the spline nut 2 to rotate synchronously; and when the rotation angle of the spline shaft 1 is not smaller than the clearance between the first rolling body 23 and the side wall of the second slot section 12, the spline shaft 1 can drive the spline nut 2 to rotate synchronously to transmit torque and force.

The ball spline device of this embodiment of the present disclosure sets the same raceway groove on the spline shaft 1 as two structures with different widths. Therefore, when the spline nut 2 is in a position corresponding to the first groove section 11, the spline shaft 1 cooperates with the spline nut 2 in a constrained manner to transmit torque and force; and when the spline nut 2 is in a position corresponding to the second groove section 12, there's a larger clearance between the first rolling body 23 and the side wall of the second groove section 12, so that there's a wobble amount between the spline shaft 1 and the spline nut 2 along the circumferential direction, for example, when the spline nut 2 remains still, the spline shaft 1 is allowed to have a small wobble amount, thus it is easy to realize connection or cooperation of the spline shaft 1 with other external components. Such ball spline device can realize more functions, and improve the flexibility of applications.

Figure 2:
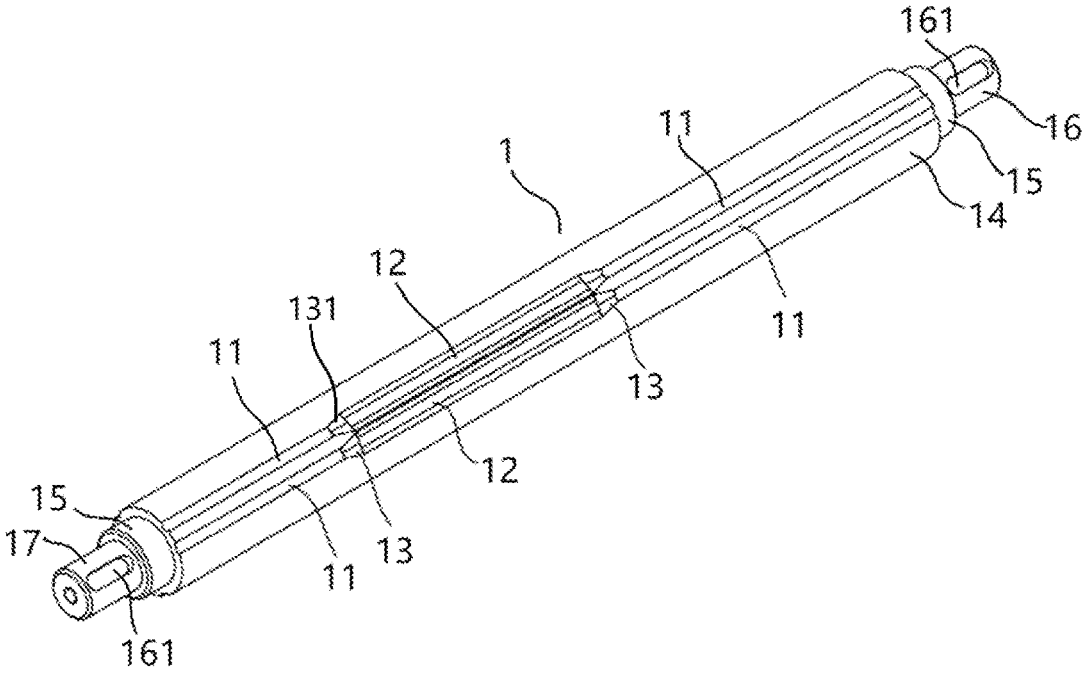
FIG. 2 is a structure diagram of some embodiments of the spline shaft in the ball spline device of the present disclosure.

In some embodiments, as shown in FIG. 2, the raceway groove further includes a transition groove section 13, connected between the first groove section 11 and the second groove section 12, and configured to guide the first rolling body 23 to switch between the first groove section 11 and the second groove section 12.

This embodiment enables the first rolling body 23 to switch smoothly between the first groove section 11 and the second groove section 12 through the guiding effect of the transition groove section 13, thus it can prevent the first rolling body 23 from jamming at the connection position of the two groove sections to achieve smoother and more reliable motion of the first rolling body 23; moreover, it also can reduce the wear of the first rolling body 23 and reduce vibration and noise.

As shown in FIG. 2, both side walls of the transition groove section 13 are bevels 131, and have a distance therebetween gradually increasing from the first groove section 11 to the second groove section 12. Through the guiding effect of the bevels 131, the first rolling body 23 can smoothly enter the first groove section 11 from the second groove section 12 without being in the middle position along the circumferential direction of the raceway groove, reducing the requirement for position precision of the first rolling body 23 during position switching.

In some embodiments, as shown in FIG. 2, the second groove section 12 is located in the middle region of the spline shaft 1 along the axial direction, and both ends of the second groove section 12 are provided with the first groove section 11.

This embodiment enables the spline nut 2 to selectively move to any of the first groove sections 11 when it is necessary to transmit power through the ball spline device, which can increase the flexibility of use. If a first transmission member 5 is mounted on one end of the spline shaft 1 and power is transmitted by moving the spline nut 2 to the first groove section 11 near the first transmission member 5, in the case of moving the spline nut 2 to the second groove section 12, the spline nut 2 can be away from the first transmission member 5, facilitating adjustment of the cooperation relationship of the first transmission member 5 and the external second transmission member 7 by moving the spline nut 2 relative to the spline shaft 1 along the circumferential direction. For example, when the spline nut 2 is connected with the wheel 3 and the spline nut 2 is moved from the outer first groove section 11 to the second groove section 12, the wheel 3 is away from the first transmission member 5, so that it is easy to observe the cooperation relationship of the first transmission member 5 and the external second transmission member 7, or to expose the first transmission member 5 that was originally obscured by the wheel 3.

In some embodiments, as shown in FIG. 1, a plurality of groups of raceway grooves are disposed along the circumferential direction, each group of the raceway grooves including two spaced raceway grooves, and the circumferential spacing of the adjacent group of raceway grooves being greater than that of adjacent raceway grooves in the same group. For example, three groups of raceway grooves are uniformly disposed along the circumferential direction.

In this embodiment, the first rolling bodies 23 provides a uniform and stable support force to the spline nut 2 in the entire circumferential direction by means of a plurality of groups of raceway grooves, so that the spline shaft 1 steadily provides power to the spline nut 2 during rotation and prevents the spline nut 2 from wobbling. Moreover, the adjacent group of raceway grooves includes two spaced raceway grooves, which can transmit torque jointly through two columns of first rolling bodies 23 in the same circumferential region, thereby reducing the force on the first rolling bodies 23 and providing working reliability and service life.

Figure 3:
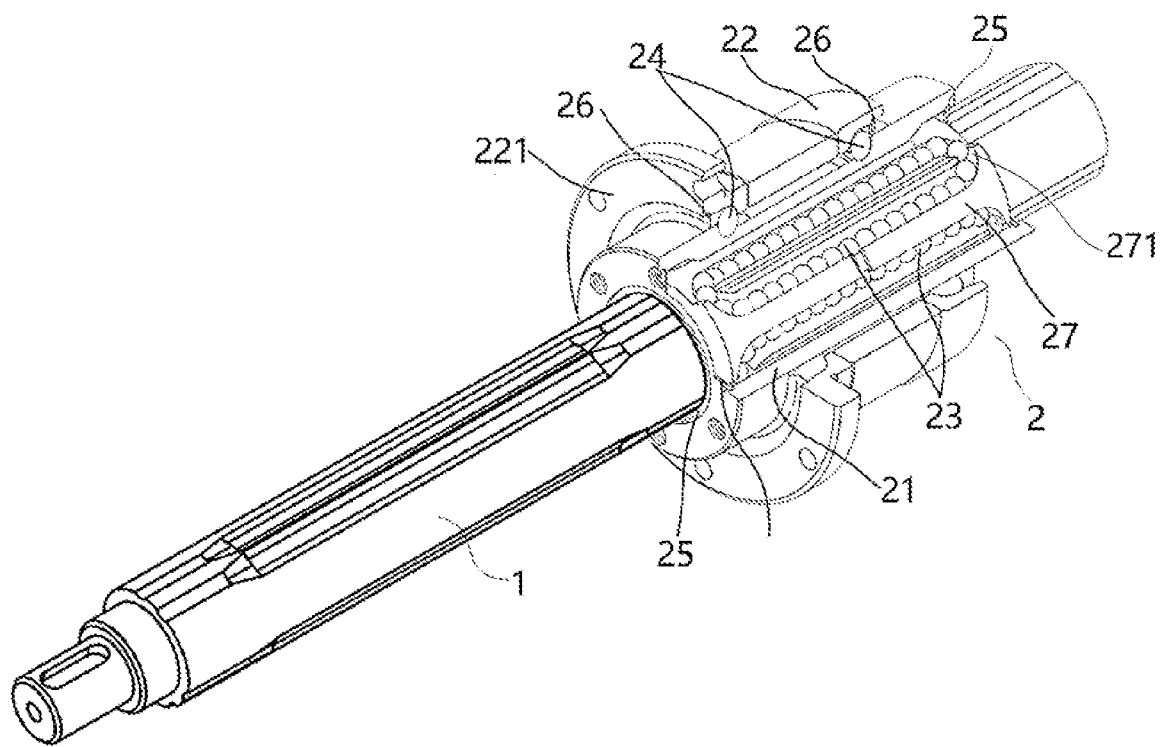
FIG. 3 is a structure diagram of some embodiments of a ball spline device of the present disclosure.

In some embodiments, as shown in FIG. 3, the spline nut 2 is provided with a plurality of grooves, and the ball spline device further includes a plurality of first holders 27 correspondingly disposed in the plurality of grooves one by one. Each first holder 27 is provided with an oval shape guide groove 271 extending along the axial direction, which is filled with a plurality of first rolling bodies 23 to form a circular rolling body queue, the first rolling bodies 23 on both sides of the circular rolling body queue being located in adjacent raceway grooves in the same group. The first rolling bodies 23 are limited jointly by the raceway grooves, the spline nut 2 and the first holders 27.

Figure 6:
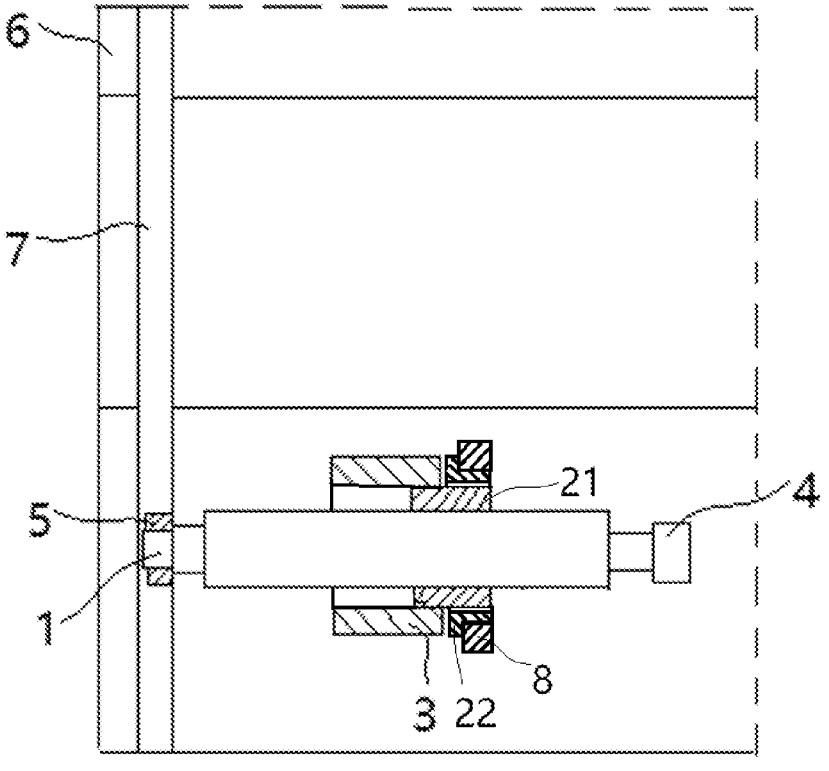
FIG. 6 is a schematic diagram that the ball spline device of the present disclosure cooperates with a stereoscopic warehouse to achieve lifting when it is applied to an automated guided vehicle.

In some embodiments, as shown in FIGS. 2 and 6, the first end of the spline shaft 1 has a first mounting portion 16 configured to connect to a drive member 4 that provides power to the rotation of the spline shaft 1; and the second end of the spline shaft 1 has a second mounting portion 17 configured to be connected with an external first transmission member 5.

In particular, the spline shaft 1 includes a main body shaft section 14, and a first mounting section 16 and a second mounting section 17 connected to both ends of the main body shaft section 14 along the axial direction, a transition shaft section 15 may be either disposed between the main body shaft section 14 and the first mounting portion 16, and the transition shaft section 15 may also be disposed between the main body shaft section 14 and the second mounting portion 17.

For example, the first mounting portion 16 and the second mounting portion 17 may also use a shaft section structure, and a keyway 161 may be disposed in the shaft section to achieve connection with the drive member 4 or the first transmission member 5 by providing a key in the keyway 161. For example, the drive member 4 may be an electric motor or a motor, etc., and the first transmission member 5 may be a gear, worm, a driving wheel, or the like.

This embodiment can realize both connection with the drive member 4 to provide power for the motion of the spline nut device and connection with the external first transmission member 5 via the spline shaft 1, so as to transmit the power of the spline shaft 1 to other external components.

In some embodiments, as shown in FIG. 3, the ball spline device further includes two groups of first seal members 25, disposed between the spline nut 2 and the spline shaft 1 and located at two ends of the spline nut 2 along the axial direction, wherein the first rolling bodies 23 are located between two groups of first seal members 25. For example, the first seal member 25 may use a seal ring or the like.

This embodiment can prevent dust or impurities from entering the space between the spline nut 2 and the spline shaft 1, ensure that the first rolling body 23 can move flexibly, and prevent seepage of lubricating oil.

Based on the above embodiments, the spline nut 2 can be set in two forms.

In some embodiments, the spline nut 2 adopts an integral structure. When the spline nut 2 is in the first position, power and torque can be transmitted to the spline nut 2 through the spline shaft 1; and when the spline nut 2 is in the second position, the spline shaft 1 is allowed to have a predetermined movable allowance relative to the spline nut 2 in the circumferential direction.

In some embodiments, the spline nut 2 includes an inner nut 21, an outer nut 22 and a second rolling body 24. Wherein, the inner nut 21 is sleeved outside the spline shaft 1, the outer nut 22 is sleeved outside the inner nut 21, and a second rolling body 24 is movably disposed between the inner nut 21 and the outer nut 22 along the circumferential direction, so as to enable relative rotation of the inner nut 21 and the outer nut 22. The inner nut 21 may be connected with a rotating component such as the wheel 3, and the outer nut 22 may be connected with a fixed support frame 8, etc.

In particular, the outer wall of the inner nut 21 is provided with an outer raceway, the inner wall of the outer nut 22 is provided with an inner raceway, and the second rolling body 24 moves in the space formed by the constraint of the inner raceway and the outer raceway, so as to enable relative rotation between the inner nut 21 and the outer nut 22. Wherein, the first rolling body 23 is disposed between the inner nut 21 and the raceway groove, and in order to transmit power, the inner wall of the inner nut 21 is also provided with a raceway.

This embodiment is a ball spline device of a nut-rotating type, which can realize both the transmission of power to the spline nut 2 through the spline shaft 1 and the rotation of the outer nut 22 relative to the inner nut 21, and also enable the spline shaft 1 to have a predetermined gap in the circumferential direction while the spline nut 2 remains immobile. Such ball spline device can realize more functions and can meet the working requirements of a transmission system more widely and flexibly.

Further, the spline nut 2 further includes a second holder disposed between the inner nut 21 and the outer nut 22, configured to keep the spacing between a plurality of second rolling bodies 24.

Further, the ball spline device further includes two groups of second seal members 26, disposed between the inner nut 21 and the outer nut 22 and located at both ends of the outer nut 22 along the axial direction, wherein the second rolling bodies 24 are located between the two groups of second seal members 26. For example, the second seal member 26 may be a seal ring or the like.

This embodiment can prevent dust or impurities from entering the space between the inner nut 21 and the outer nut 22, ensure that the first second bodies 24 can move flexibly, and prevent seepage of lubricating oil.

In order to achieve stability of the spline nut 2 when moving along the axial direction, the number of the first rolling bodies 23 in a single raceway groove can be increased, which will increase the length of the inner nut 21. In order for a smaller and more compact structure, the axial length of the outer nut 22 is smaller than that of the inner nut 21.

In order to arrange other structural attachments on the spline nut 2 to transmit power through the splined nut device, as shown in FIG. 3, the outer side wall of the outer nut 22 is provided with a flange structure 221, which may be a flange plate, etc. The flange structure may be located at the end of the outer nut 22 or at other location along the axial direction.

Second, the present disclosure provides an automated guided vehicle ("Automated Guided Vehicle", AGV for short). In some embodiments, the automated guided vehicle includes the ball spline device in the above embodiment, a wheel 3 and a drive member 4. Wherein, the wheel 3 is coaxially mounted to the spline nut 2, and the drive member 4 is configured to provide drive power for the rotation of the spline shaft 1. In particular, as shown in FIGS. 3 and 6, the wheel 3 can be mounted on the inner nut 21.

In this embodiment, when the spline nut 2 is in the first position, the first rolling body 23 is enabled to be in the first groove section 11, the spline shaft 1 cooperates with the spline nut 2 in a constrained manner to transmit torque and force, and the rotation of the wheel 3 can be achieved to enable walking of the automated guided vehicle; and when the spline nut 2 is in the second position, the first rolling body 23 is in the second groove section 12, there's a predetermined gap between the first rolling body 23 and the side wall of the second groove section 12, allowing the spline shaft 1 to have a wobble amount relative to the spline nut 2 while the position of the wheel 3 remains unchanged, so that the spline shaft 1 is adapted to the connection or cooperation with other external components. Such automated guided vehicle can be flexibly adjusted according to the use requirements and can be adapted to different use functions.

In some embodiments, as shown in FIG. 3, the spline nut 2 includes: an inner nut 21 sleeved outside the spline shaft 1, the inner nut 21 being connected with the wheel 3, for example, connected with the wheel 3 through a fixing hole in the end of the inner nut 21; and an outer nut 22 sleeved outside the inner nut 21 and rotatably disposed relative to the inner nut 21, the outer nut 22 being connectable to the support frame 8 disposed on the automated guided vehicle by means of the flange structure 221. Wherein, the first rolling body 23 is disposed between the inner nut 21 and the raceway groove.

As shown in FIGS. 2 and 6, the first end of the spline shaft 1 has a first mounting portion 16, the drive member 4 is in drive connection with the first mounting portion 16, and the second end of the spline shaft 1 has a second mounting portion 17. The automated guided vehicle further includes a first transmission member 5, connected to the second mounting portion 17, and configured to cooperate with an external second transmission member 7. For example, the first transmission member 5 may be a gear, and the second transmission member 7 may be a rack or a gear ring, etc.

When the spline nut 2 is in the second position, the first transmission member 5 is configured to be adjusted to cooperate with the second transmission member 7 while the position of the wheel 3 remains unchanged.

This embodiment enables movement of the automated guided vehicle by means of the cooperation of the first transmission member 5 and the second transmission member 7, for example, movement along the rack, and can enable movement of the automated guided vehicle along a horizontal, inclined or vertical direction depending on the mounting direction of the rack, or enable movement of the automated guided vehicle along an outer gear ring, etc. When it is necessary to move the automated guided vehicle by means of cooperation of the first transmission member 5 with the second transmission member 7, the wheel 3 can be moved manually or by means of the drive member 4 until the spline nut 2 is in the second position, and at this point, the spline shaft 1 is allowed to have a predetermined gap with respect to the spline nut 2 in the circumferential direction, and the first transmission member 5 can be adjusted along the circumferential direction, so that the first drive member 5 is engaged with the second drive member 7 while the position of the wheel 3 is unchanged.

In some embodiments, the automated guided vehicle has a walking mode and a moving mode when the spline nut 2 is in the first position. Wherein, in the walking mode, the automated guided vehicle is configured to drive rotation of the wheel 3 through driving the spline shaft 1 by the drive member 4 to achieve walking; and in the moving mode, the automated guided vehicle is configured to drive rotation of the first transmission member 5 through driving the spline shaft 1 by the drive member 4 to achieve movement, but the wheel 3 does not participate in the movement.

Third, the present disclosure further provides a stereoscopic warehouse system, as shown in FIG. 6, including a stereoscopic warehouse 6 and the automated guided vehicle of the above embodiment. Wherein, the stereoscopic warehouse 6 has a plurality of layers of storage positions, and is provided with a second transmission member 7, which includes a vertical rack; the automated guided vehicle includes a first transmission member 5 which includes a gear, the first end of the spline shaft 1 has a first mounting portion 16, the drive member 4 is in drive connection with the first mounting portion 16, and the second end of the spline shaft 1 has a second mounting portion 17 connected to the gear, wherein when the spline nut 2 is in the second position, the gear is configured to be adjusted to cooperate with the second transmission member 7 while the position of the wheel 3 is unchanged.

When the automated guided vehicle needs to walk between the different stereoscopic warehouses 6, or to walk in a storage position in a certain layer of the stereoscopic warehouse 6, the wheel 3 is moved along the axial direction until the spline nut 2 is in the first position, and at this point, the drive member 4 can drive rotation of the spline nut 2 and the wheel 3 through the spline shaft 1 to enable walking.

When the automated guided vehicle needs to move upward in the stereoscopic warehouse 6 to achieve lifting, or move downward to achieve descending, so as to move between the storage positions in different layers, the wheel 3 can be moved along the axial direction until the spline nut 2 is in the second position, and at this point, the spline shaft 1 is allowed to have a predetermined gap relative to the spline nut 2 along the circumferential direction, and the first transmission member 5 can be adjusted along the circumferential direction so that the gear is engaged with the rack while the position of the wheel 3 is unchanged. And then, the drive member 4 can drive the gear to move along the rack by means of the spline shaft 1, and the spline nut 2 and the wheel 3 rotate to enable up and down movement of the automated guided vehicle to move up and down, so as to reach the storage positions in the different layers.

In some embodiment, the predetermined gap is not smaller than the tooth width of the gear or the rack, so that it can ensure that the gear is adjusted to be engaged with the rack while the position of the wheel 3 is unchanged.

In some embodiments, the automated guided vehicle has a walking mode and a moving mode when the spline nut 2 is in the first position. In the walking mode, the automated guided vehicle is configured to drive rotation of the wheel 3 through driving the spline shaft 1 by the drive member 4 to achieve walking; and in the moving mode, the automated guided vehicle is configured to drive motion of the gear along the rack through driving the spline shaft 1 by the drive member 4 to achieve movement in the vertical direction, so as to reach storage positions in different layers.

The ball spline device, the automated guided vehicle and the stereoscopic warehouse system provided by the present disclosure are introduced in detail. The principle and implementations of the present disclosure are set forth herein by using specific embodiments, and illustration of the above embodiments is merely for helping understanding of the method of the present disclosure and the core concept thereof. It should be noted that various improvements and modifications may also be made to the present disclosure for a person of ordinary skill in the art without departing from the principle of the present disclosure, and these improvements and modifications also fall into the protection scope of claims of the present disclosure.

The invention claimed is:

1. An automated guided vehicle, comprising a ball spline device, a wheel and a drive member, wherein the ball spline device, comprises:

a spline shaft, an outer side wall of which is provided with a raceway groove extending along an axial direction, the raceway groove comprising a first groove section and a second groove section communicated along the axial direction, a width of the second groove section being greater than a width of the first groove section;

a spline nut, coaxially sleeved outside the spline shaft; and a first rolling body, movably disposed in the raceway groove along the axial direction, so as to achieve relative movement of the spline nut and the spline shaft;

wherein when the spline nut is in a first position, the first rolling body is in the first groove section and cooperates with the first groove section in a constrained manner, so as to cause synchronous rotation of the spline nut and the spline shaft; and when the spline nut is in a second position, the first rolling body is in the second groove section, so that there is a predetermined gap in a circumferential direction between the spline shaft and the spline nut;

wherein the wheel is coaxially mounted to the spline nut, the drive member is configured to provide drive power for the rotation of the spline shaft, and the spline nut comprises:

an inner nut, sleeved outside the spline shaft and connected with the wheel;

an outer nut, sleeved outside the inner nut, the outer nut is provided with a flange structure, and the outer nut is connected with a support frame disposed on the automated guided vehicle by means of the flange structure; and a second rolling body, movably disposed between the inner nut and the outer nut along the circumferential direction, so as to enable relative rotation of the inner nut and the outer nut;

wherein the first rolling body is disposed between the inner nut and the raceway groove.

2. The automated guided vehicle according to claim 1, wherein the raceway groove further comprises a transition groove section, the transition groove section connected between the first groove section and the second groove section, and configured to guide the first rolling body to switch between the first groove section and the second groove section.

3. The automated guided vehicle according to claim 2, wherein both side walls of the transition groove section are bevels, and have a distance therebetween gradually increasing from the first groove section to the second groove section.

4. The automated guided vehicle according to claim 1, wherein there are two first groove sections, the second groove section is located in the middle region of the spline shaft along the axial direction, and both ends of the second groove section are communicated with the two first groove sections, respectively.

5. The automated guided vehicle according to claim 1, wherein a first end of the spline shaft has a first mounting portion configured to connect to a drive member that provides power to the rotation of the spline shaft; and a second end of the spline shaft has a second mounting portion configured to be connected with an external first transmission member.

6. The automated guided vehicle according to claim 1, further comprising:

two first seal members, disposed between the spline nut and the spline shaft and located at two ends of the spline nut along the axial direction;

wherein the first rolling body is located between the two first seal members.

7. The automated guided vehicle according to claim 6, further comprising:

two second seal members, disposed between the inner nut and the outer nut and located at two ends of the outer nut along the axial direction, wherein the second rolling body is located between the two second seal members.

8. The automated guided vehicle according to claim 1, wherein a first end of the spline shaft has a first mounting portion, the drive member is in drive connection with the first mounting portion, and a second end of the spline shaft has a second mounting portion;

the automated guided vehicle further comprises a first transmission member, the first transmission member connected to the second mounting portion and configured to cooperate with an external second transmission member.

9. The automated guided vehicle according to claim 8, wherein when the spline nut is in the second position, the first transmission member is configured to be adjusted to cooperate with the second transmission member while a position of the wheel remains unchanged.

10. The automated guided vehicle according to claim 8, wherein the automated guided vehicle is configured to have a walking mode and a moving mode when the spline nut is in the first position;

wherein in the walking mode, the automated guided vehicle is configured to drive rotation of the wheel through driving the spline shaft by the drive member to achieve walking; and in the moving mode, the automated guided vehicle is configured to drive rotation of the first transmission member through driving the spline shaft by the drive member, so as to achieve movement through cooperation of the first transmission member and the second transmission member.

11. A stereoscopic warehouse system, comprising:

a stereoscopic warehouse, having a plurality of layers of storage positions and provided with a second transmission member which comprises a vertical rack; and an automated guided vehicle according to claim 1, comprising a first transmission member which comprises a gear, a first end of the spline shaft having a first mounting portion, the drive member being in drive connection with the first mounting portion, and a second end of the spline shaft having a second mounting portion connected to the gear;

wherein when the spline nut is in the second position, the gear is configured to be adjusted to cooperate with the second transmission member while a position of the wheel is unchanged.

12. The stereoscopic warehouse system according to claim 11, wherein the automated guided vehicle is configured to have a walking mode and a moving mode when the spline nut is in the first position;

in the walking mode, the automated guided vehicle is configured to drive rotation of the wheel through driving the spline shaft by the drive member to achieve walking; and in the moving mode, the automated guided vehicle is configured to drive motion of the gear along the rack through driving the spline shaft by the drive member to achieve movement in the vertical direction, so as to reach storage positions in different layers.

\* \* \* \* \*

14